United States Patent [19]
Liou et al.

[11] Patent Number: 5,795,012
[45] Date of Patent: Aug. 18, 1998

[54] COLLAPSIBLE CAR SHIELD STRUCTURE

[76] Inventors: Nick Liou, No. 8, Alley 15, Lane 8, Ta-Tung W. Rd., Taoyuan; Michael Kann, No. 29-9, Sec. 5, Nan-King E. Rd., Taipei, both of Taiwan

[21] Appl. No.: 650,651

[22] Filed: May 20, 1996

[51] Int. Cl.$^6$ .................................................. B60J 11/00
[52] U.S. Cl. .................... 296/136; 135/88.05; 135/16
[58] Field of Search .............................. 296/99.1, 136; 135/88.01, 88.05, 98, 16

[56] References Cited

U.S. PATENT DOCUMENTS 4,805,654  2/1989  Wang ...................................... 296/136

FOREIGN PATENT DOCUMENTS 2289361  7/1976  France ................................... 296/136
4026546  11/1994  WIPO .................................... 296/136

*Primary Examiner*—Dennis H. Pedder
*Attorney, Agent, or Firm*—Ladas & Parry

[57] ABSTRACT

A collapsible car shield structure comprises a main body, a primary worm, a number of worm gears, a number of large belt pulleys, a number of small belt pulleys, a number of primary legs, a number of secondary legs, and a number of driving belts. The main body is formed with a number of slots each having at least two upstanding side plates. The primary worm is centrally pivotally mounted on the main body. The large belt pulleys are respectively firmly fixed on the upstanding side plates of the slots of the main body. The primary leg includes a proximal end and a distal end in which the proximal end is pivoted on the upstanding side plates of the main body by a short shaft. The worm gear is firmly secured to the proximal end of the primary leg and engages with the primary worm. The secondary leg includes a proximal end and s distal end, in which the proximal end is firmly secured with the small belt pulley and is pivoted on the distal end of the primary leg. The small belt pulley and the large belt pulley are coupled by the driving belt, so that when the primary worm drives the worm gears to swing the primary legs, the secondary legs swing relative to the primary legs to quickly and easily expand or withdraw the collapsible car shield structure.

15 Claims, 10 Drawing Sheets

COLLAPSIBLE CAR SHIELD STRUCTURE

The present invention relates generally to a collapsible car shield structure and in particular to a collapsible car shield structure which uses a worm to drive worm gears for moving primary legs, in combination with driving belts that are stationary, to move small belt pulleys for swinging secondary legs when the primary legs are swinging, so that the car shield expands and collapses in an efficient manner.

BACKGROUND OF THE INVENTION

Cars have been important transportation means for modern people. However, with no garage to park the car, the car will be gradually damaged by the outdoor weather. Further, on a holiday trip, especially in sunny summer weather, cars usually reach intolerable high temperatures due to exposure to sun radiation. Thus, a car shield is of a vital importance in the protection against sun radiation and rain and is thus eagerly desired by people.

A conventional car shield is an effective device for shielding the car from sun's rays, rain or dust. However, it is quite cumbersome to mount and dismount the conventional car shield. As such, most people dislike the conventional car shield.

ROC patent application Ser. No. 80215985 (ROC Patent Publication No. 215213) granted to the applicant of the present invention relates to a collapsible structure of car dust shield. Such a car dust shield structure, although easier to expand and collapse than the conventional structure, yet needs manual operation to open and close the shield and thus is still inconvenient in use.

SUMMARY OF THE INVENTION

The primary object of the present invention is to provide a collapsible car shield which is simple in structure, easy in operation, efficient in operation and can be used at any place. The collapsible car shield structure generally comprises a main body, a primary worm, a number of primary legs, a number of secondary legs, a number of worm gears, a number of large belt pulleys, a number of small belt pulleys, a number of driving belts and an electrical motor. The main body is formed with a number of slots. The primary worm is centrally pivoted at the main body and is to be driven and rotated by the electrical motor. Each primary leg includes a proximal end and a distal end, in which the proximal end is secured with a worm gear and is pivoted at one of the slots of the main body. The worm gears engage with the primary worm, so that they are driven by the primary worm. Each large belt pulley is secured to the slot. Each secondary leg includes a proximal end and a distal end, in which the proximal end thereof is secured with a small belt pulley and is pivoted at the distal end of the primary leg. The driving belt connects between the respective large belt pulley and small belt pulley so that when the motor drives the primary worm to rotate, the primary worm in turn drives the worm gears to swing the primary legs outward or inward. And, the outward/inward swinging movement of the primary legs, through the transmission of the driving belt between the large and small belt pulleys, swings the secondary legs to expand or collapse so as to expand/collapse the car shield canopy in an efficient manner.

These and other objects, advantages and features of the present invention will be more fully understood and appreciated by reference to the written specification.

DETAILED DESCRIPTION OF THE INVENTION

Figure 1:
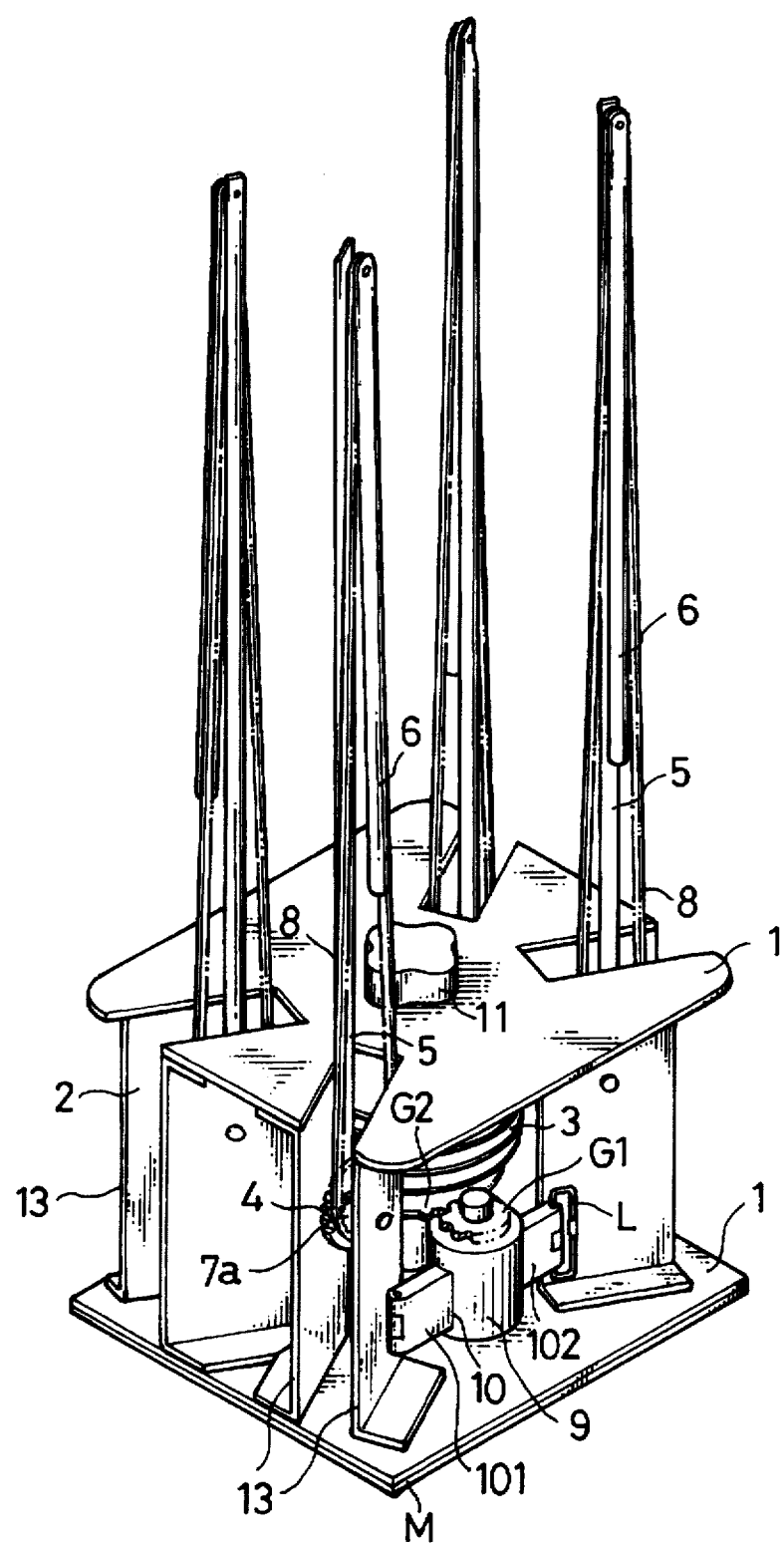
FIG. 1 is a perspective view of a preferred embodiment of a collapsible car shield structure in accordance with the present invention illustrating that the primary legs and secondary legs are in the collapsed condition.
Figure 2:
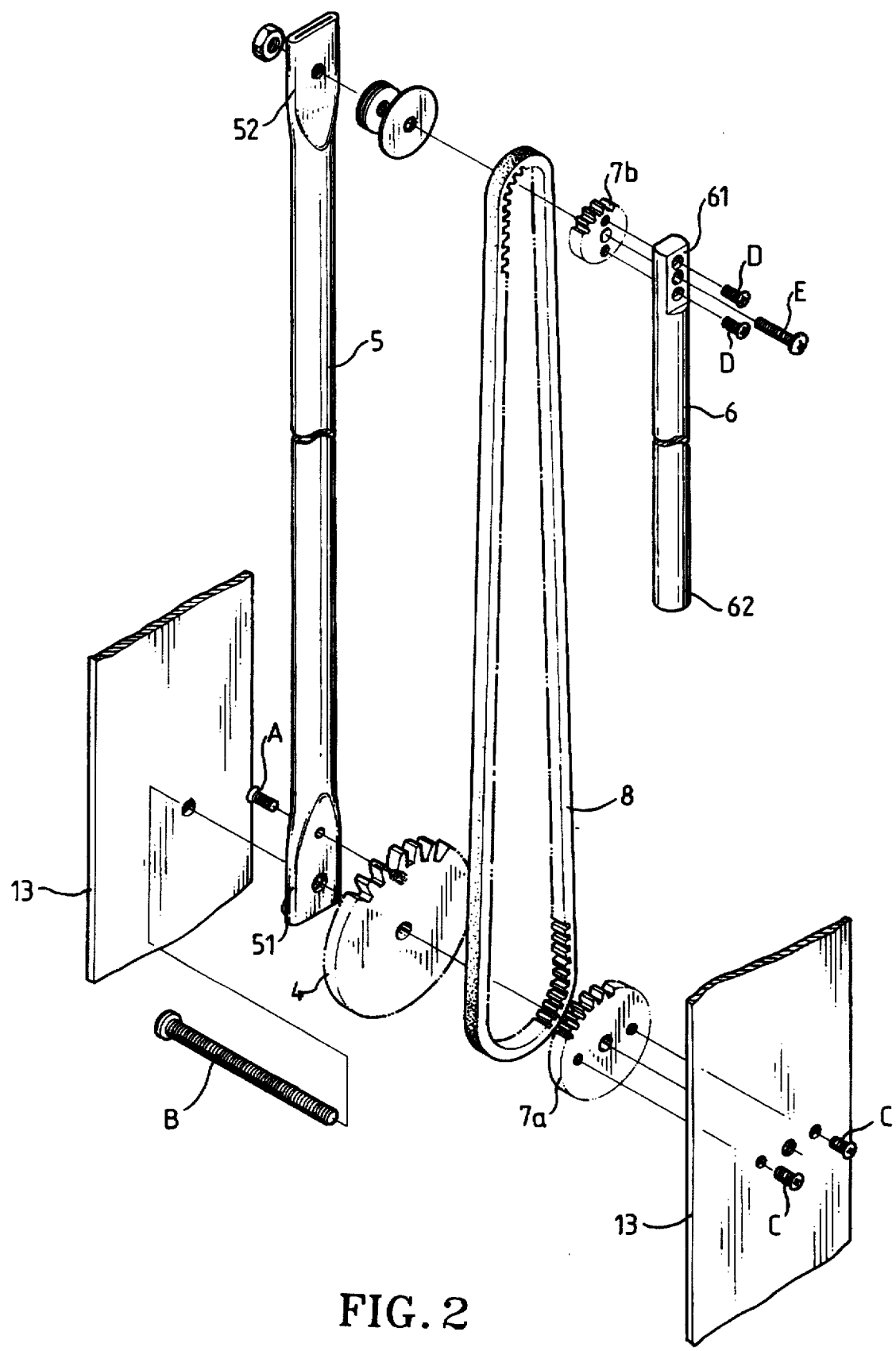
FIG. 2 is an exploded perspective view of the primary leg and secondary leg constructed in accordance with the present invention.
Figure 3:
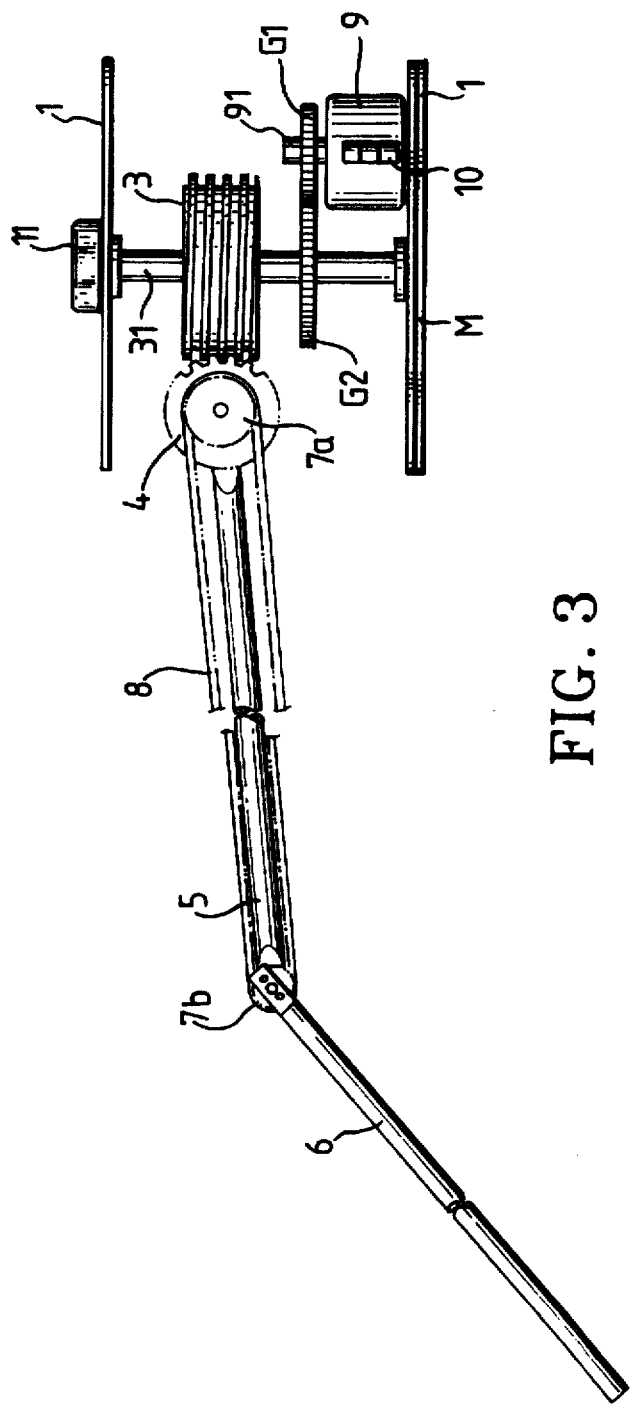
FIG. 3 is a schematically side view of the collapsible car shield structure of the present invention, showing that the primary worm is driven by the motor so as to move the worm gear to swing the primary leg up/down and to expand/withdraw the secondary leg through the transmission of the driving belt between the small and large belt pulleys.

As shown in FIGS. 1, 2 and 3, a preferred embodiment of the collapsible car shield structure of the present invention generally comprises a main body (1), a primary worm (3), four worm gears (4), four primary legs (5), four secondary legs (6), four large belt pulleys (7a), four small belt pulleys (7b), four driving belts (8) and an electrical motor (9). The main body (1) is formed with four slots (2) on four corners thereof. Each of the slots (2) comprises two upstanding side plates (13). The primary worm (3) includes an axle (31) and is centrally pivotally mounted on the main body (1) in an upright manner.

Referring to FIG. 2, the primary legs (5) and secondary legs (6) are each in the form of a slender, elongated bar. The primary leg (5) includes a proximal end (51) and a distal end (52), in which the proximal end (51) is firmly secured to the respective worm gear (4) by means of a bolt (A) and is pivoted in between the two upstanding side plates (13) of the respective slot (2) by means of a bolt (B). The worm gear (4) engages with the primary worm (3) so as to be driven by the primary worm (3)(see FIG. 3).

As shown in FIG. 2, each of the large belt pulleys (7a) is co-axially arranged with the respective worm gear (4) about the bolt (B). The large belt pulley (7a), however, is fixed to the slot side plate (13) by means of two bolts (C) so that it will not rotate with worm gear (4).

Each of the secondary legs (6) has a proximal end (61) and a distal end (62). A small belt pulley (7b) is firmly fixed to the proximal end (61) by means of two bolts (D). A further bolt (E) pivots the proximal end (61) of the secondary leg (6) to the distal end (52) of the primary leg (5). The driving belt (8) couples the large and small belt pulleys (7a) and (7b).

Figure 8:
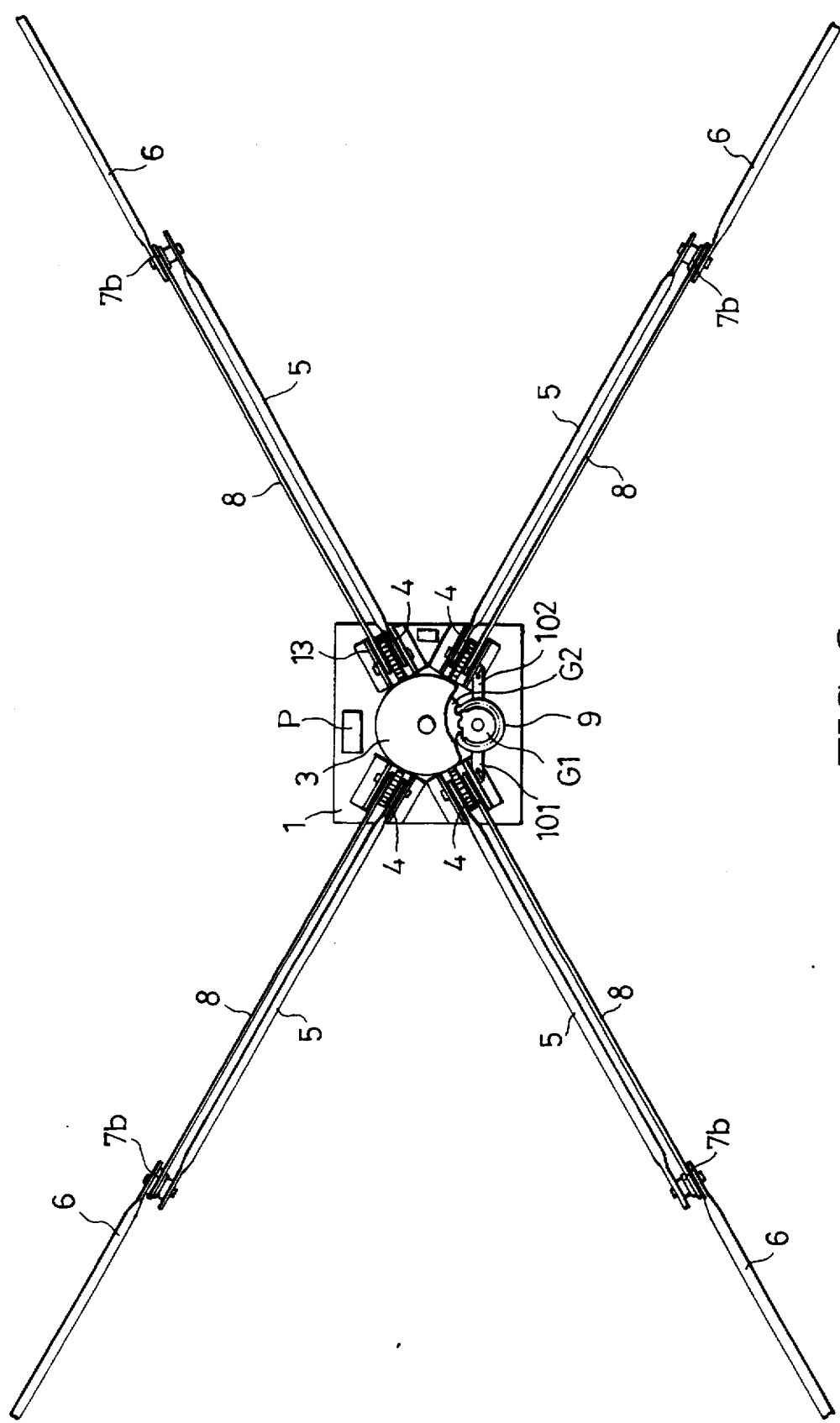
FIG. 8 is a top view of the present invention, showing the engagement of the electrical motor to the primary worm and the driving operation of the primary worm as it is affected by the electrical motor.
Figure 9:
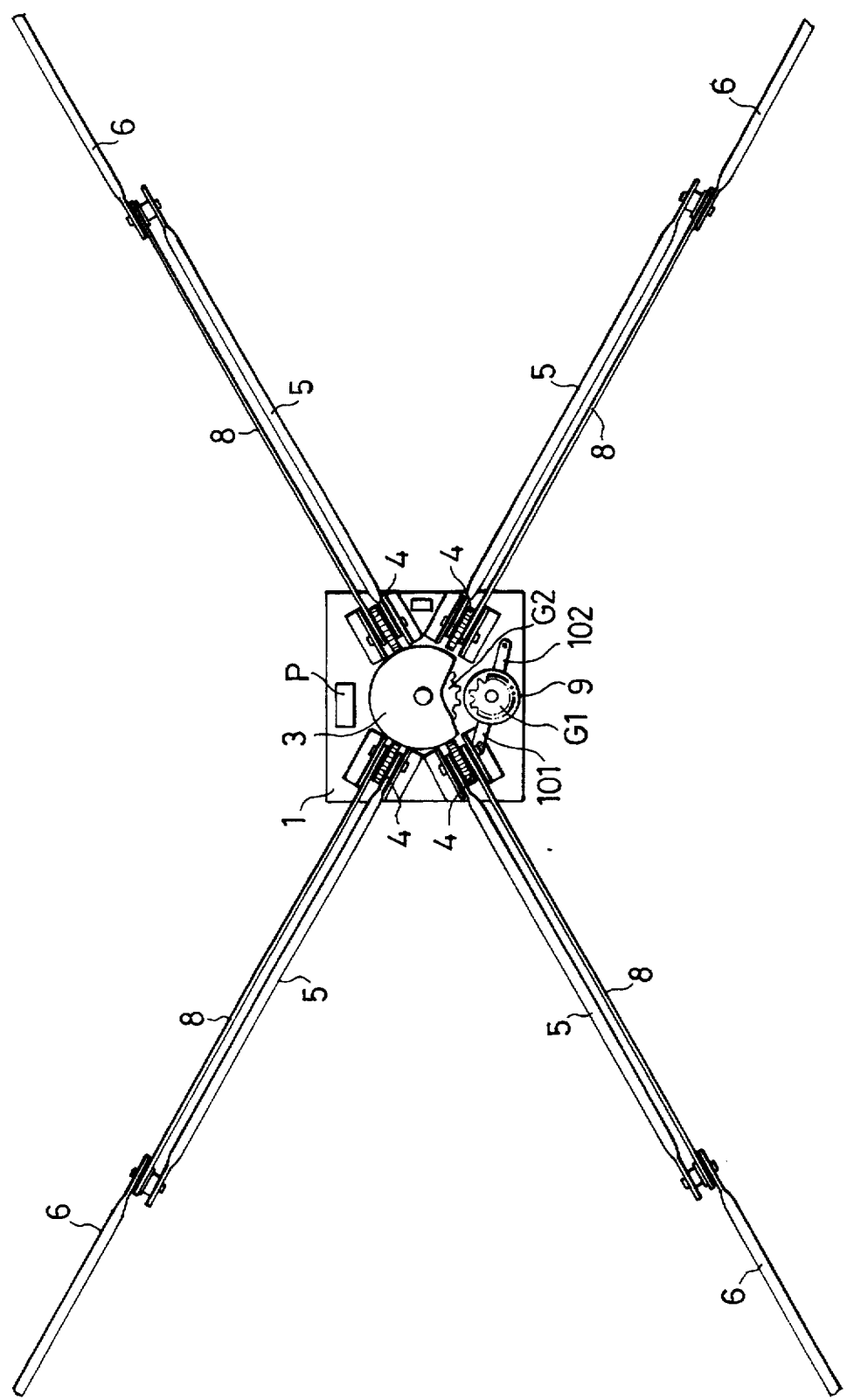
FIG. 9 is another top view of the present invention, showing the electrical motor when it is disengaged from the primary worm which will allow the collapsible car shield to be manually operated.

As shown in FIGS. 1 and 3, the electrical motor (9) includes a shaft (91) and is mounted on the main body (1) by means of a frame (10). The motor (9) rotates the primary worm (3) through a means of a gear including a first gear and a second gear (G1) and (G2), in which the first gear (G1) is secured on the shaft (91) of the motor (9), and the second gear (G2) is attached to the axle (31) of the primary worm (3). The frame (10) includes a first end (101) hinged to one of the slot side plates (13) and a second end (102) detachably connected to the opposite slot side plate (13) so as to allow the frame (10) to be moved outward for the disengagement of the gears (G1) and (G2) from each other and thus allowing the electrical motor (9) to disengage from the primary worm (3) (as shown in FIGS. 8 and 9). Further, the second end (102) of the frame (10) that is detachable from the slot side plate (13) can be secured in position by means of a lock or a latch (L) so as to prevent the frame (10) from being accidentally detached from the slot side plate (13).

The main body (1) further includes a manually operable handle (11) provided on top thereof. The handle (11) is co-axially secured to the axle (31) of the primary worm (3) so as to allow a user to manually drive the primary worm (3) by rotating the handle (11).

Figure 4:
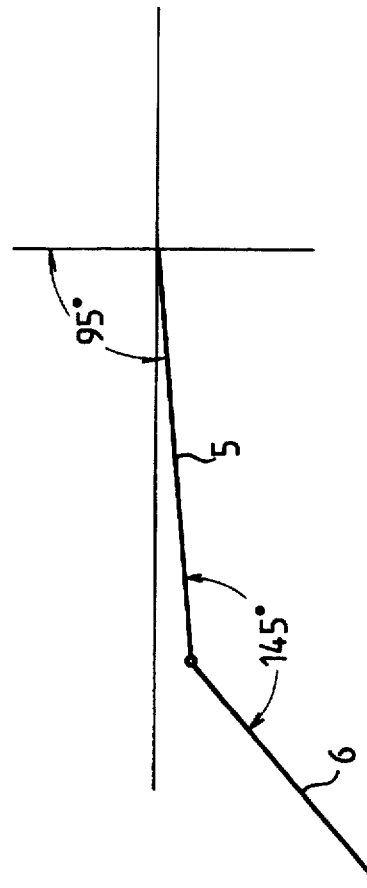
FIG. 4 is a schematic view showing the expansion of the primary and secondary legs of the present invention.
Figure 6:
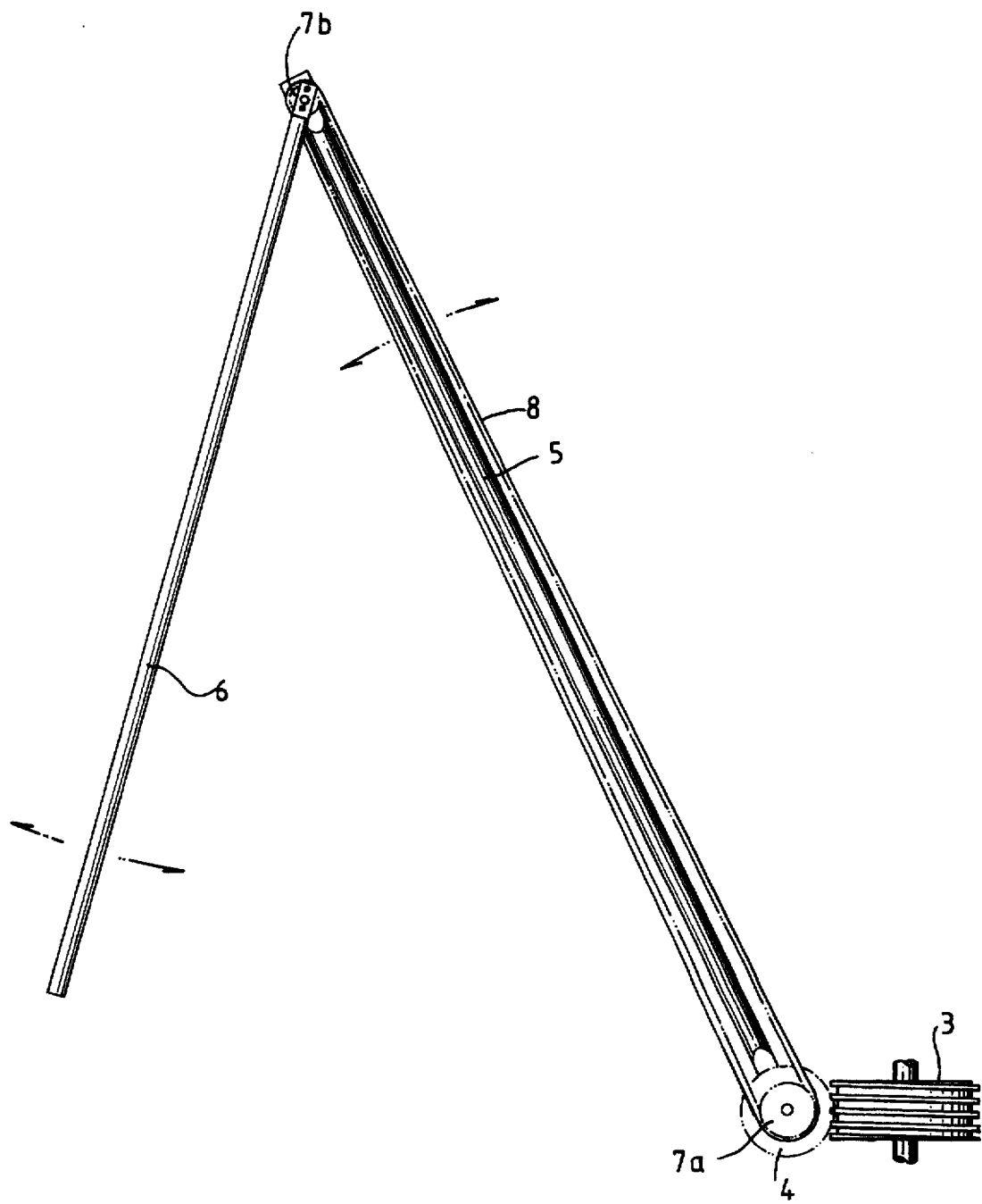
FIG. 6 is a schematic view of the primary leg and secondary leg, together with the primary worm, showing the primary and secondary legs when they are not fully expanded or collapsed.
Figure 5:
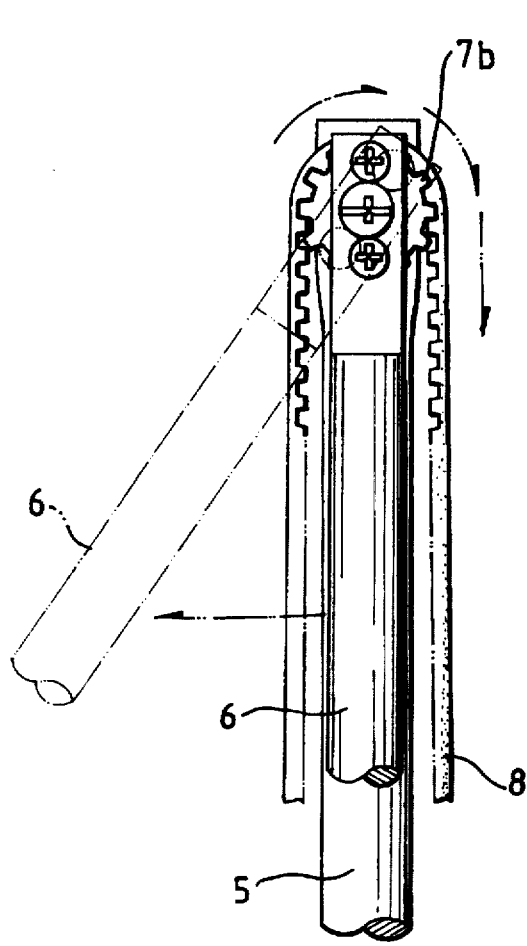
FIG. 5 is a schematic view showing the outward expansion of the primary leg and secondary leg of the present invention, showing that when the primary leg is swung downward and outward, the small belt pulley is actuated by the driving belt to outward expand the secondary leg.
Figure 7:
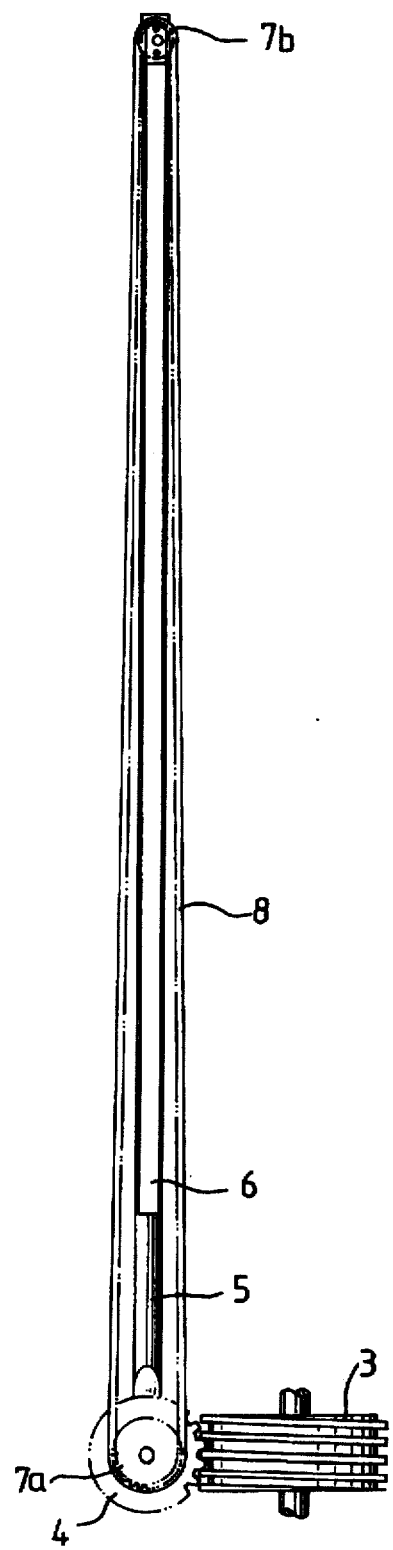
FIG. 7 is a schematic view of the primary leg and secondary leg, together with the primary worm, showing the primary and secondary legs when they are fully collapsed to an upstanding condition.

As shown in FIGS. 1, 2, 3, 4, 5 and 6, when the electrical motor (9) rotates or when the user rotates the handle (11), the primary worm (3) is driven to rotate which in turn rotates the worm gears (4) to drive the primary legs (5) to swing at an angle a (such as 95 degrees) downward (see FIG. 4) from an upright, collapsed position (see FIG. 7) to an expanded position (see FIG. 3). As can be seen in FIG. 5, since the large belt pulleys (7a) are firmly fixed on the slot side plates (13), when the primary legs (5) swing downward, the worm gears (4) rotate in relation to the large belt pulleys (7a) and thus making the large belt pulleys (7a) force the small belt pulleys (7b) to rotate through the driving belts (8) and the secondary legs (6) that are fixed to the small belt pulleys (7b) are forced to quickly swing an angle β (for example 145 degrees) outward. The outward swinging angle β of the secondary legs (6) is determined by the ratio between the numbers of teeth or the diameters of the large and small belt pulleys (7a) and (7b). For the shape of the top of a regular passenger car, the primary legs (5) may be designed to swing downward 95 degrees from an upright position, while the secondary legs (6) swing 145 degrees outward relative to the primary legs (5) (as shown in FIG. 4).

Figure 12:
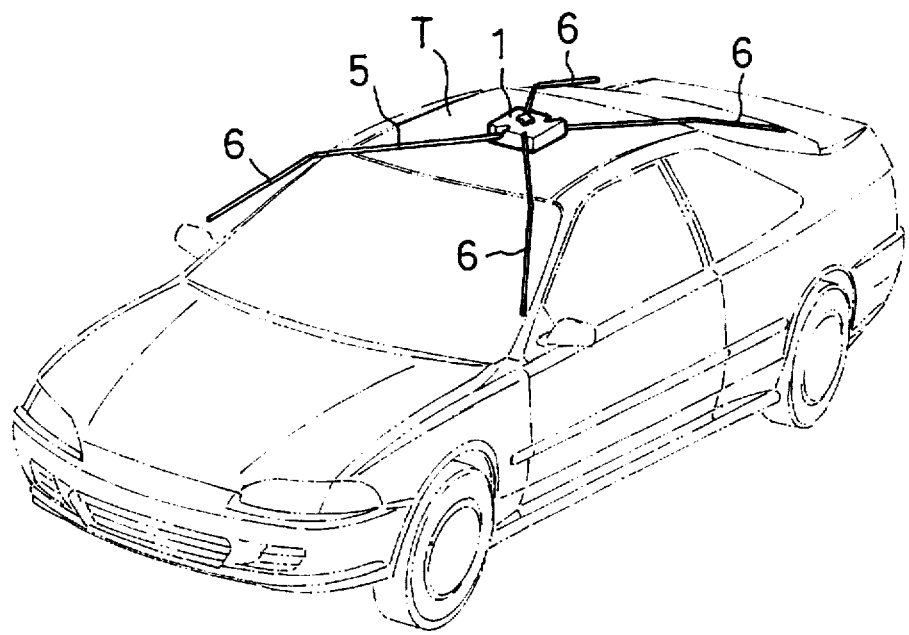
FIG. 12 is a perspective view showing the collapsible car shield if when mounted on the top of a car.
Figure 13:
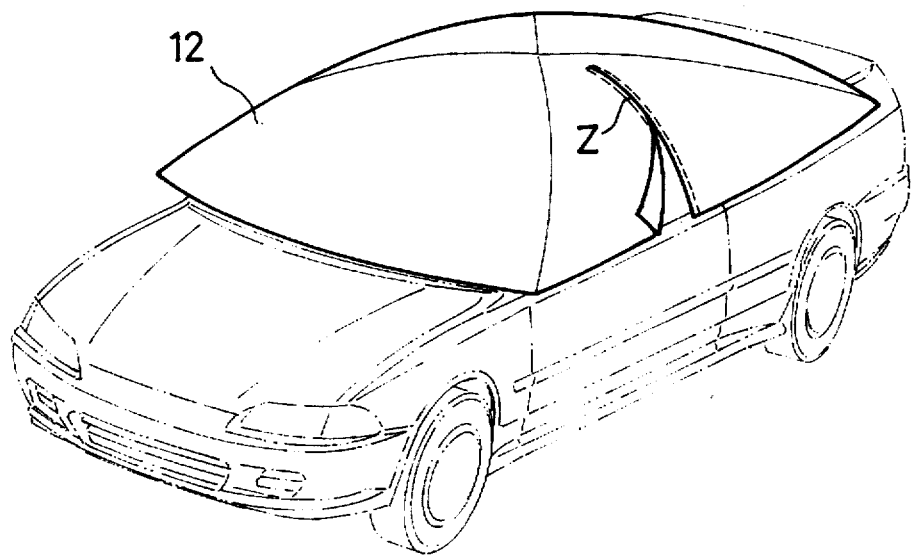
FIG. 13 is a perspective view showing the collapsible car shield, together with a canopy, mounted on the top of a car, the canopy with a zipper will allow access to the collapsible car shield for manual operation.

As shown in FIGS. 1, 8 and 9, when the collapsible car shield structure of the present invention completely expands the canopy (12) (as shown in FIGS. 12 and 13), the electrical motor frame (12) may be fixed in position on the main body (1) by means of a lock or latch (L) to prevent un-expectedly or un-authorizedly detaching therefrom. Since the primary worm (3) is coupled to the electrical motor (9) the collapsible car shield structure does not allow a person to release a canopy (12) with the manually operable handle (11) under this condition and thus providing burglar-proof effectiveness. In addition, since the electrical motor frame (10) has a detachable design, it is possible to operate the collapsible car shield structure with the manually operable handle (11) by disengaging the electrical motor (9) from the primary worm (3) when the electrical drive system is out of order (such as power shortage, motor breakdown or control malfunction).

As shown in FIGS. 1 and 12, to allow easy installation of the collapsible car shield structure of the present invention on a car top (T), the main body (1) has magnet means comprised of rubber magnet (M) fixed on the underside thereof to magnetically fix the main body (1) to the car top (T).

Figure 10:
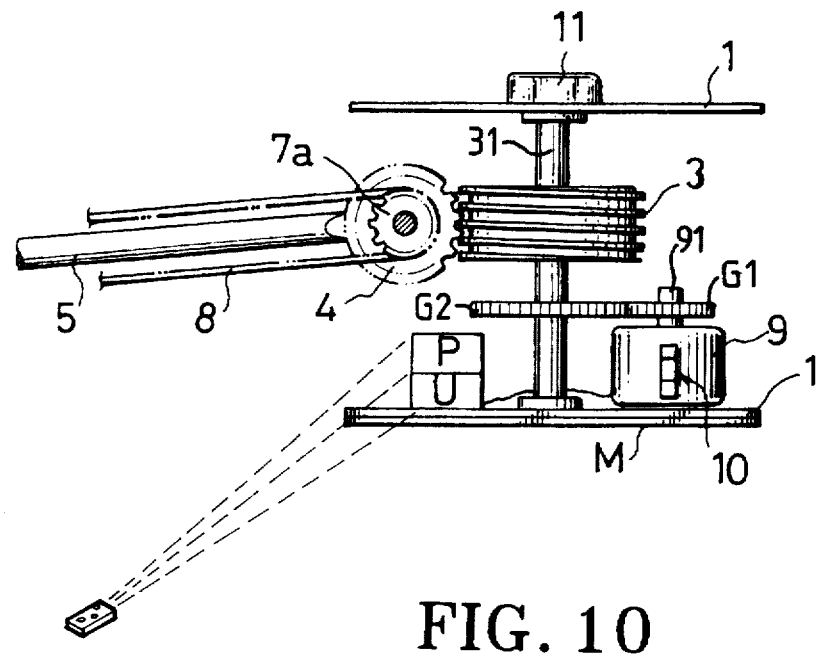
FIG. 10 is a schematic side view of another embodiment of the present invention, showing the electrical motor when it is incorporated with a remote control signal receiving unit which is to be controlled by a remote control to rotate, reverse and stop the motor.
Figure 11:
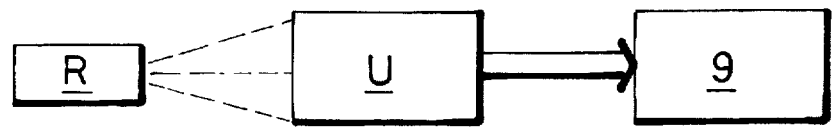
FIG. 11 is a block diagram showing the operation of the remote control shown in FIG. 10.

As shown in FIGS. 10 and 11, to allow the collapsible car shield structure to be an independently operable unit, the main body (1) may be provided with a battery (P) as power source. Further, to allow the collapsible car shield structure to be remote-controllable, the main body (1) may be provided with remote control signal receiving unit (U). In operation, the unit (U) receives remote signals from a remote control (R) to control the rotation, reversal and stop of the electrical motor (9) so as to control the expansion and collapse of the collapsible car shield structure in a remote-controllable manner.

As shown in FIGS. 12 and 13, when a canopy (12) is expanded by the collapsible car shield structure to shield the top of a car, the canopy (12) is separated from the car top (T) by means of the support of the primary and secondary legs (5) and (6) so as to allow air to flow through between the car top (T) and the canopy (12) to facilitate heat removal.

As shown in FIGS. 12 and 13, the canopy (12) may be provided with a zipper (Z) extending from the center to an edge of the canopy (12). When the canopy (12) is expanded on the car top (T), under the condition where the remote control system malfunctions, by opening the zipper (Z), the user's hand is allowed to gain access the main body (1) for releasing the coupling between the primary worm (3) and the electrical motor (9), and thus allowing the user's hand to manually operate the handle (11) for collapsing the canopy (12).

Figure 14:
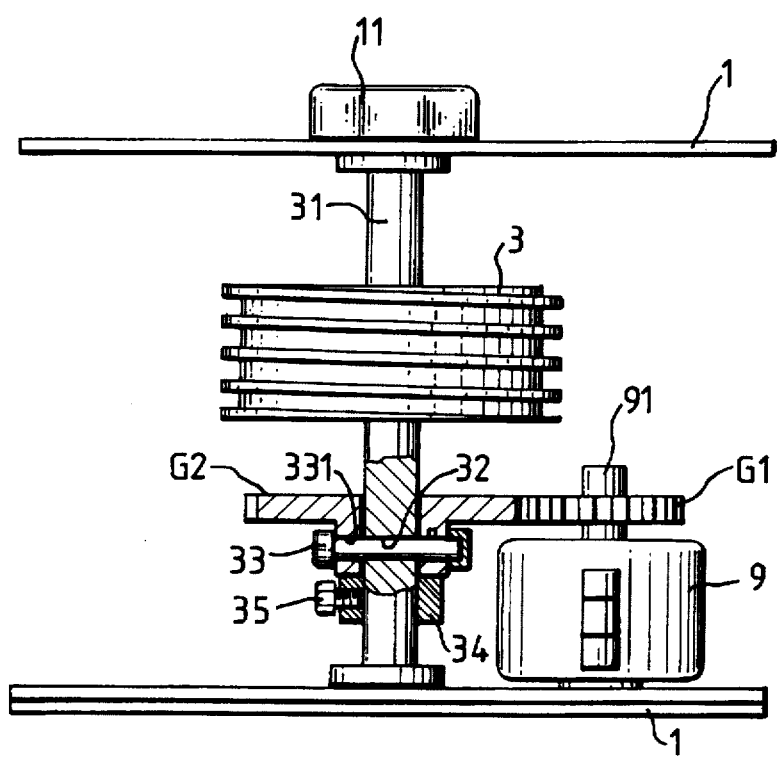
FIG. 14 is a schematic side view showing an alternative for the coupling between the electrical motor and the primary worm, in which the motor is secured on the main body and the second gear of the primary worm is journally mounted on the axle of the primary worm.

FIG. 14 shows an alternative of the coupling between the motor (9) and the primary worm (3). The motor (9) attached with the first gear (G1) is firmly secured on the main body (1). The second gear (G2) is journally mounted on the axle (31) of the primary worm (3). The axle (31) is formed with a transverse through hole (32). The second gear (G2) is also formed with a through hole (331) corresponding to the transverse through hole (32) of the axle (31) to allow a bolt or a lock (33) to pass therethrough for preventing relative rotation between the axle (31) and the second gear (G2). A supporting sleeve (34) is provided and is secured onto the axle (31) by a bolt (35), so as to maintain the second gear (G2) in a position where the second gear (G2) engages the first gear (G1). When the bolt or lock (33) is withdrawn out of the second gear (G2), the axle (31) of the primary worm (3) disengages from the second gear (G2) and the motor (9), and can be freely rotated by the handle (11). When second gear (G2) is positioned on the axle (31) by the bolt or lock (33), the axle (31) of the primary worm (3) engages with the second gear (G2), and in turn engages with the first gear (G1) and the motor (9).

As those skilled in the art may realize, there are variations and modifications that can be made on the collapsible car shield structure of the present invention without departing from the spirit and scope of the present invention.

We claim:

1. A collapsible car shield structure, comprising:

a main body formed with a number of slots each having at least two upstanding side plates;

a primary worm having an axle and centrally pivotally mounted to the main body in an upright manner through said axle;

a plurality of large belt pulleys respectively firmly fixed on the upstanding side plates of the slots of the main body;

a plurality of primary legs, each having a proximal end and a distal end, said proximal end having a worm gear attached thereto and being pivoted between the two side plates of each of the slots with a short shaft, the worm gear being engaged with said primary worm to be driven thereby;

a plurality of secondary legs, each having a proximal end and a distal end, the proximal end having a small belt pulley attached thereto and being pivoted to the distal end of the respective primary leg with a short shaft; and a plurality of driving belts respectively extending between one of the large belt pulleys and one of the small belt pulleys.

2. The collapsible car shield structure according to claim 1, wherein said worm gear is driven by said primary worm to swing said primary leg at an angle ($\alpha$) between an upstanding, collapsed position and an expanded position, and wherein said secondary leg, in the movement of said primary legs, by means of said driving belts actuating the small belt pulleys, swings at an angle $\beta$ relative to said primary legs.

3. The collapsible car shield structure according to claim 1, wherein the numbers of the slots, the large belt pulleys, the primary legs, the secondary legs, the small belt pulleys and the worm gears are all four.

4. The collapsible car shield structure according to claim 1, further comprising an electrical motor mounted on the main body to drive the primary worm, and a gear means for coupling the motor and the primary worm.

5. The collapsible car shield structure according to claim 4, wherein the gear means for coupling the motor and the primary worm comprises a first gear secured to a shaft of the electric motor and a second gear co-axially mounted on the axle of the primary worm in a place to be engaged with the first gear.

6. The collapsible car shield structure according to claim 4, wherein the electrical motor is mounted on the main body by means of a frame which has a first end hinged to one of the slot side plates and a second end detachably fixed to the opposite slot side plate so as to allow the electrical motor to optionally engage with or disengage from the primary worm.

7. The collapsible car shield structure according to claim 2, wherein the swing angle ($\alpha$) of the primary legs and the swing angle ($\beta$) of the secondary legs has a ratio determined by the ratio of the diameters of the large and small belt pulleys.

8. The collapsible car shield structure according to claim 2, wherein the swing angle ($\alpha$) of the primary legs is 95 degrees and the swing angle ($\beta$) of the secondary legs is 145 degrees.

9. The collapsible car shield structure according to claim 1, further comprising a manually operable handle disposed above the main body to co-axially secured to the axle of the primary worm for manual rotation of the primary worm.

10. The collapsible car shield structure according to claim 1, further comprising a battery for supplying power to the electrical motor.

11. The collapsible car shield structure according to claim 4, further comprising a remote control signal receiving unit arranged on the main body to receive a remote control signal from a remote control for controlling the rotation, reversal and stop of the motor.

12. The collapsible car shield structure according to claim 1, wherein the main body comprises a rubber magnet fixed on the underside thereof for attaching to the top of a car.

13. The collapsible car shield structure according to claim 5, wherein the second gear mounting includes a removable bolt.

14. The collapsible car shield structure according to claim 13, wherein the axle of the primary worm is formed with a transverse through hole, and the second gear is also formed with a through hole corresponding to the through hole of the primary worm, to facilitate the bolt passing therethrough.

15. The collapsible car shield structure according to claim 13, wherein the second gear is supported and maintained in a position to engage with the first gear by using a supporting sleeve secured on the axle.

* * * * *